United States Patent [19]

Otty

[11] Patent Number: 4,964,291
[45] Date of Patent: Oct. 23, 1990

[54] COIL SHAPERS FOR COILS OF ROTATING ELECTRIC MACHINES

[75] Inventor: Macolm Otty, Merseyside, United Kingdom

[73] Assignee: Automated Coil Systems Limited, Liverpool, England

[21] Appl. No.: 861,648

[22] Filed: May 5, 1986

Related U.S. Application Data

[63] Continuation of Ser. No. 689,306, Jan. 7, 1985, abandoned, which is a continuation of Ser. No. 529,734, Sep. 6, 1983, abandoned.

[30] Foreign Application Priority Data

Sep. 9, 1982 [GB] United Kingdom ............... 8225804

[51] Int. Cl.⁵ .............................................. B21D 53/00
[52] U.S. Cl. ......................................... 72/298; 72/295; 29/596
[58] Field of Search .......... 72/295, 298, 293, 301–305, 72/311, 387; 29/596, 605, 736

[56] References Cited

U.S. PATENT DOCUMENTS

| | | | |
|---|---|---|---|
| 1,435,284 | 11/1922 | Fathauer | 72/295 |
| 1,495,959 | 5/1924 | Mavity | 72/295 |
| 1,566,227 | 12/1925 | Pleasant | 72/301 |
| 2,106,525 | 1/1938 | Henry . | |
| 2,207,881 | 7/1940 | Smith . | |
| 2,451,222 | 10/1948 | James | 72/295 |
| 2,506,219 | 5/1950 | James | 269/25 |
| 2,841,200 | 7/1958 | James | 72/298 |
| 2,962,076 | 11/1960 | Durham | 72/298 |
| 3,145,756 | 8/1964 | Hill | 72/298 |
| 3,452,786 | 7/1969 | Lund et al. | 29/596 |
| 4,145,006 | 3/1979 | Webb . | |
| 4,262,891 | 4/1981 | Kinney . | |
| 4,317,560 | 3/1982 | Troyer . | |
| 4,402,234 | 9/1983 | Malarz et al. . | |

*Primary Examiner*—Daniel C. Crane
*Attorney, Agent, or Firm*—Oblon, Spivak, McClelland, Maier & Neustadt

[57] ABSTRACT

A coil shaper for coils of rotating electric machines such as motors and generators spreads so-called diamond coils from a coil loop blank with grippers for the corners of the coil and a powered mechanism moving the grippers apart from an initial position for insertion of the elongated loop blank to a final position in which the coil is shaped and the grippers rotated so as to angle the straight, parallel, slot-fitting sections about their lengthwise directions, and comprising also endwise disposed grippers for controlling the knuckles of the coil. The shaper effects automatically the proper shaping of the overhangs of the coil, dispensing with the malletting operations conventionally required in coil making.

18 Claims, 5 Drawing Sheets

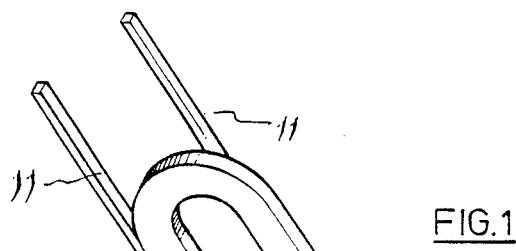
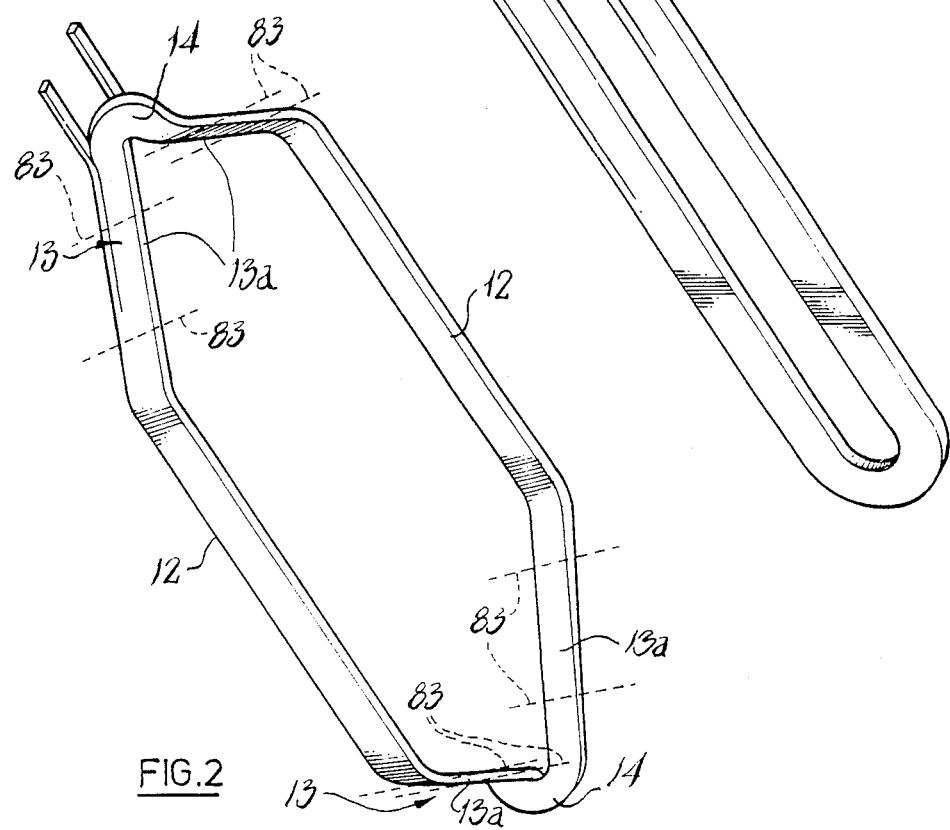

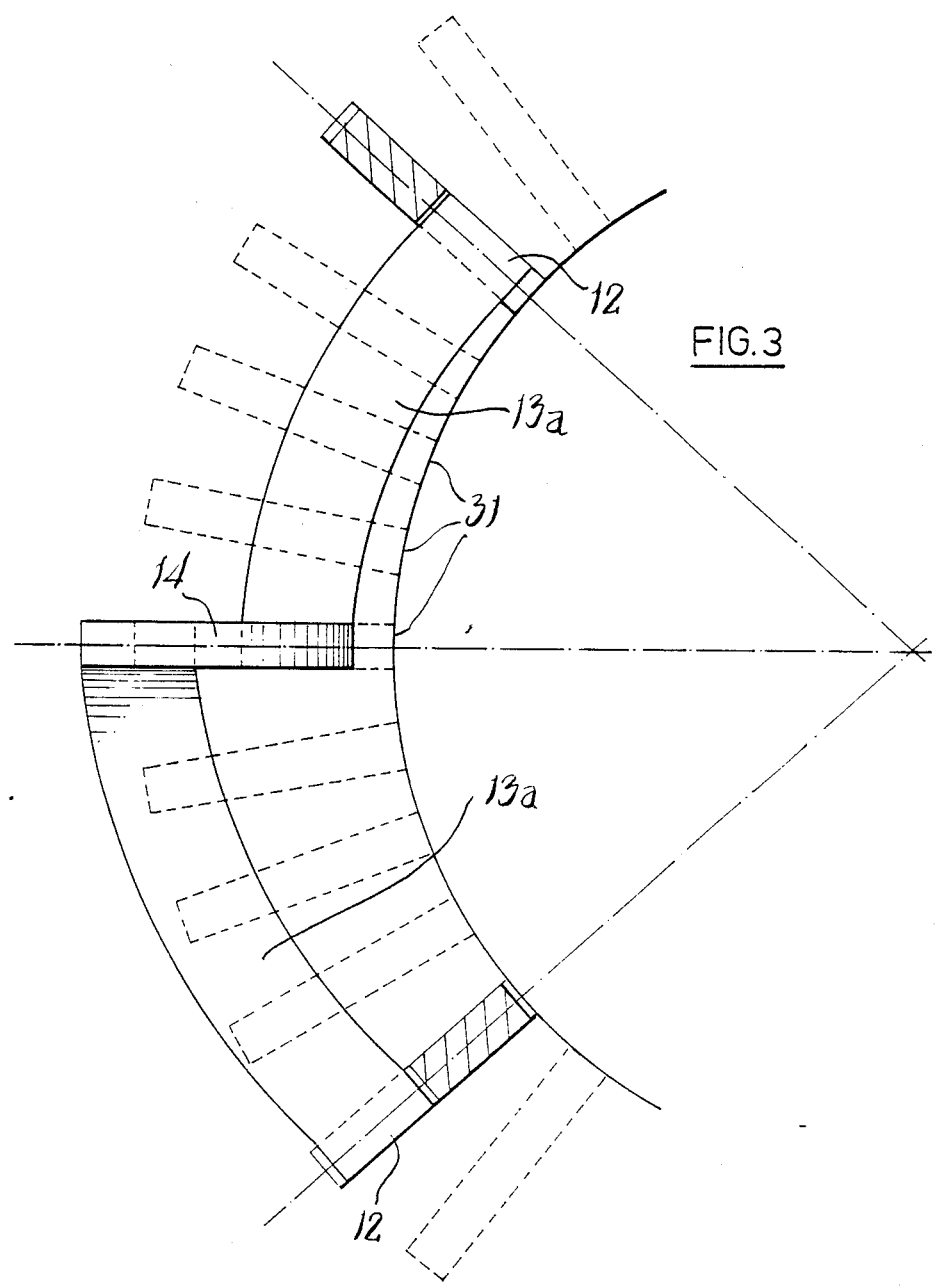

COIL SHAPERS FOR COILS OF ROTATING ELECTRIC MACHINES

This application is a Continuation, of application Ser. No. 689,306, filed Jan. 7, 1985, now abandoned, which is a continuation, of application Ser. No. 529,734, filed Sept. 6, 1983, now abandoned.

This invention relates to coil shapers for coils for rotating electric machines, more particularly for so-called 'diamond' coils for larger such machines. Such coils comprise loops of conductor, usually copper, having a generally rectangular cross-section that will be a snug fit in a rotor or stator slot. The loops are of a generally rectangular shape with two straight parallel sections, that fit into angularly spaced apart rotor or stator slots, connected by end sections.

Such coils are made from rectangular cross-section copper strip by winding an elongate loop of several turns of strip so as to form a laminated conductor of generally rectangular cross-section. This loop, which is so narrow that the two parallel straight sections may be touching or practically so, is then pulled out in width on a shaper that brings it to the final shape required to fit the rotor or stator slots. The shaper not only pulls out the straight sections—it also twists the one relatively to the other about its lengthwise axis to fit the angularly separated slots. As a result of this relative twisting, a characteristic "kink" appears in each end of the coil, which then displays a rounded "knuckle".

A coil shaper comprises a set of four grippers, one for each corner of the coil, initially situated so that the elongate loop can be placed in them. The grippers are pneumatically, hydraulically or otherwise separable and twistable so as to bring the loop into the coil shape required. The shaper is usually adapted to produce different sizes and shapes of coil by adjustment of its parts as required so that once an elongate loop is in position and the "go" button pressed, the operation is automatic.

On all existing coil shapers, however, certain operations must be effected manually—the only "automatic" part of the operation is the predetermined movement of the grippers.

The most important manual operation involves the formation of the "kink" above referred to, which is initiated, while the grippers are effecting their predetermined movement to spread the coil, by a mallet blow.

British Patent Application No. 8022522 (Publication No. 2079194A) describes an improved coil shaper in which the coil is held inverted as compared to previously known shapers, whereby the mallet blow could be effected more easily and accurately. Though the improvement brought about by this development was substantial, nevertheless, the requirement is still there for manual assistance at all stages of the shaping operation, including the final shaping of the ends of the coil. Not only is this expensive in terms of labour costs, but it also results in coils which are not necessarily accurately shaped and which usually require substantial further shaping to bring them within specification after the coil has been removed from the shaper. Even then, it is usually found that conventionally produced coils are not a good fit in the machine for which they are intended, and, in fitting them, further 'modification'—usually involving hammering and other operations potentially harmful to the insulation which has by now been applied to the coils—is required in winding the machine. The shaper described in Application No. 8022522 aforementioned can produce better coils than previously known shapers because less difficulty is involved at the shaping stage. It can also produce coils in less time, thereby reducing the overall coil cost. It is found to be very suitable for repair shop operations, where relatively short runs of coils are required, because not only is it far more efficient than other shapers, but also its capital cost is moderate.

However, further cost savings still need to be made in coil shaping in motor manufacturing plants, and this not only means reducing further the labour content of the coil shaping process but also improving the accuracy with which coils can be shaped so as to eliminate the further handling operations currently required.

These seemingly incompatible objects have been successfully achieved by the present invention, which provides an improved coil shaper that—depending on the number of optional features adopted—requires little or no manual attention.

The invention comprises a coil shaper for coils for rotating electric machines comprising grippers for the corners of the coil and powered means moving the grippers apart from an initial position for insertion of an elongated loop coil blank to a final position in which the coil is shaped and the grippers rotated so as to angle the straight, parallel, slot-fitting sections about their lengthwise direction, comprising also endwise-disposed grippers for controlling the knuckles of the coil.

The said endwise disposed grippers may be adapted to resist inward movement of the knuckles of the coil as the coil is spread, and are preferably controlled in resisting such movement. They may also be adapted to control twisting of the knuckles of the coil as the coil is spread, and may be controlled by fluid pressure means. Said fluid pressure means may comprise, for each gripper, a pair of piston-in-cylinder arrangements attached to anchoring points either side of the long axis of a coil mounted in the shaper and permitting controlled movement of the gripper parallel to and at right angles to said axis. Said piston-in-cylinder arrangements may themselves be angled with regard to said axis.

The said endwise-disposed grippers may comprise radius-pegs and clamp means gripping the faces of the coil blank. Said clamp means may be fluid pressure actuated.

At least one further gripper may be provided for each diagonal section of the coil between the slot-fitting sections and the knuckles. Said further gripper may be adapted to grip the part of the said diagonal section which is to remain unrotated about its lengthwise direction—if the rotation of a slot-fitting section about its lengthwise direction is regarded as a positive rotation, then the rotation of the diagonal section near the knuckle will be negative, so that in between there will be a point on the diagonal where the rotation is zero. Additional grippers may be provided for each diagonal section either side of said further gripper.

These grippers can be controlled like the main coil spreading grippers to control the shape of the diagonals and the formation of the knuckles much more accurately and with substantially less damage to the material of the coil than is possible with manual techniques. It is also, by eliminating manual intervention at this stage, possible to increase the rate of operation so that the new machine will produce many more coils per hour than prior art shapers.

The said grippers may comprise coil-section engaging claw members fixed at the ends of adjustable arms and co-operating clamping members, which latter clamping members may also be fluid pressure actuated. The adjustable arms may be adjustable both as to length and orientation, and may be adjusted by fluid pressure means.

Control means may be provided adapted to control the shaper to perform a fixed cycle of operation repetitively, and said control means may be adapted to be programmed to carry out different operational cycles to produce coils to different specifications. The control means may comprise a micro-processor, which may be programmable by inputting information about the initial loop coil blank and the configuration of the finished coil. The initial positions, namely those appropriate to the start of a coil- spreading cycle, may be adjusted manually at the start of a series of cycles, such positions being storable in micro-processor memory so that they can be restored for a new cycle. The input information can then determine the movement of the movable parts of the shaper away from their initial positions.

The shaper may also comprise loading means automatically loading a loop coil blank on to the grippers and, if desired, unloading means automatically off-loading a finished shaped coil after release of the grippers.

One embodiment of a coil shaper according to the invention will now be described with reference to the accompanying drawings, in which:

FIG. 1 is a perspective view of an elongate loop coil blank,

FIG. 2 is a perspective view of a shaped coil,

FIG. 3 is an end-on-view of part of a partly wound stator showing one coil in place

Figure 4:
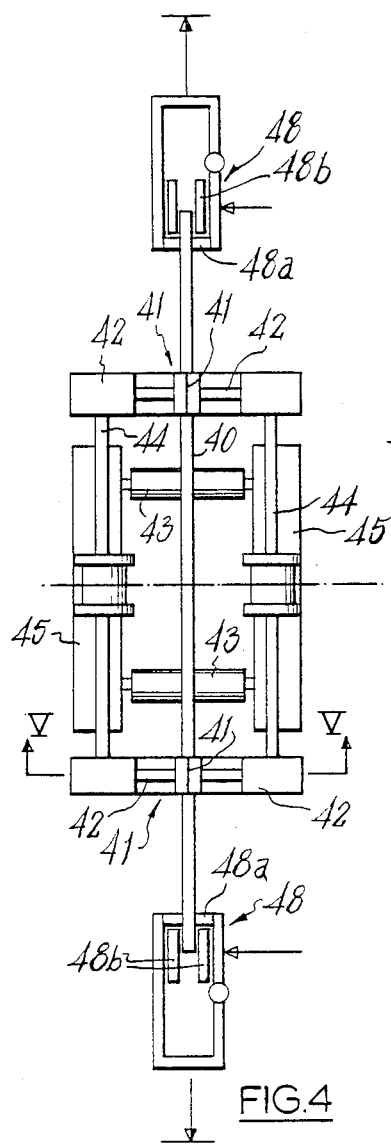
FIG. 4 is a plan view of a shaper according to the invention in its initial position

The elongate loop coil blank shown in FIG. 1 consists of a simple winding of insulated copper of rectangular cross section, the ends 11 of the copper terminating at the same end of the coil. The winding consists of about four turns. It is required to bring this blank into the shape shown in FIG. 2 in order to fit into the slots of the rotor or stator of an electric machine. FIG. 2 shows a typical coil for a larger electric motor or generator comprising a loop of generally rectangular shape with two straight, parallel sections 12 that fit—as shown in FIG. 3—into angularly spaced apart stator slots 31, connected by end sections 13. The end sections 13 comprise diagonal sections 13a joined in knuckles 14.

The straight, parallel sections 12 are angled with respect to each other, as best seen in FIG. 3, so that they align more or less precisely with radii of the stator to fit into the slots 31. This angling gives a rather complex geometry to the end sections 13 of the coil.

FIGS. 4 to 8 illustrate a coil shaper for transforming a loop coil blank as shown in FIG. 1 into a diamond coil adapted to fit the stator of a machine as shown in FIGS. 2 and 3.

Figure 6:
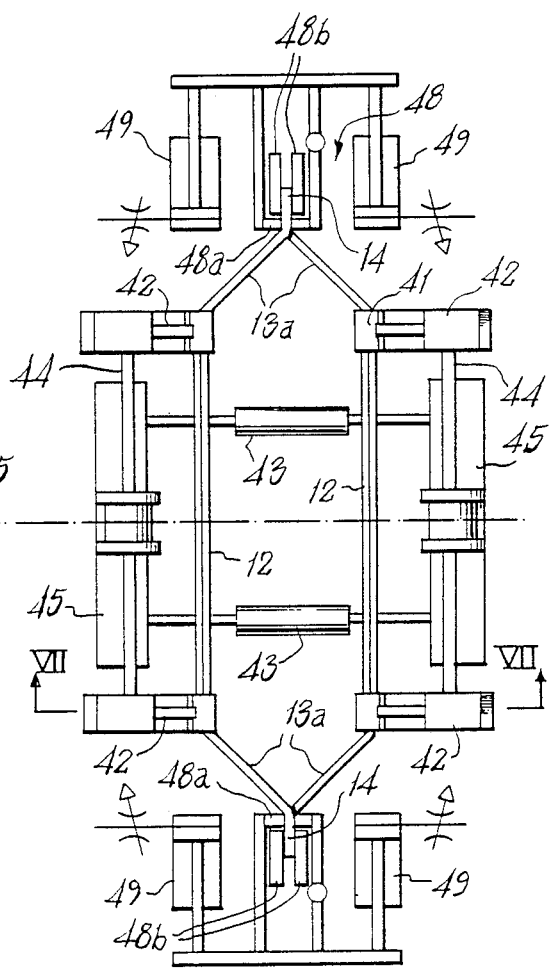
FIG. 6 is a plan view of the shaper shown in FIG. 4 after spreading a coil
Figure 5:
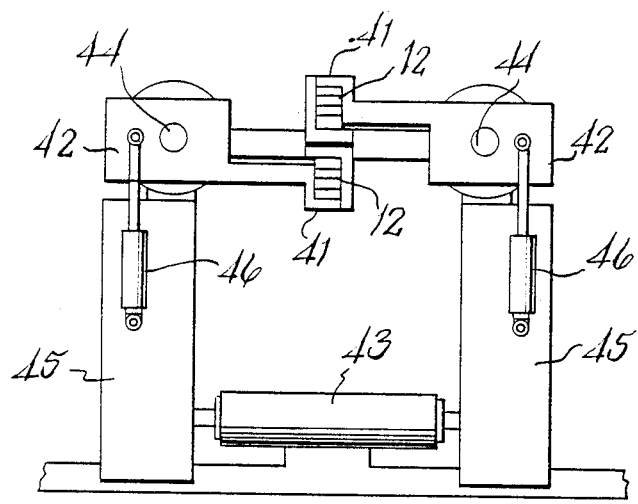
FIG. 5 is a section on the line V—V of FIG. 4
Figure 7:
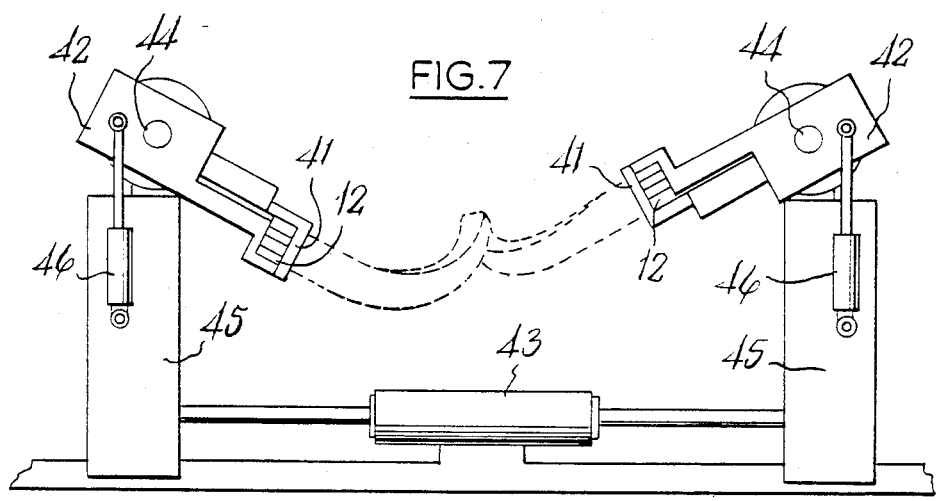
FIG. 7 is a section on the line VII—VII of FIG. 6.

The coil shaper comprises grippers 41 for the corners of the coil and powered means comprising piston-in-cylinder arrangements 42, 43 moving the grippers 41 apart from an initial position as seen in FIGS. 4 and 5 for insertion of a loop coil blank 40 to a final position as seen FIGS. 6 and 7 in which the coil is shaped as seen in FIG. 2.

The piston-in-cylinder arrangements 42 are provided one for each gripper 41, and are mounted on rotatable beams 44 mounted on carriages 45 which are separable by the piston-in-cylinder arrangements 43.

Rotation of the beams 44 rotates the grippers 41 —as best seen by comparing FIGS. 5 and 7—so as to angle the slot-fitting sections 12 of the coil about their lengthwise directions. This rotation is effected by further piston-in-cylinder arrangements 46 (FIGS. 5 and 7).

The shaper also comprises endwise disposed grippers 48 for controlling the knuckles 14 of the coil. The grippers 48 are adapted to resist inward movement of the knuckles 14 of the coil as the coil is spread. This resistance is effected by piston-in-cylinder arrangements 49 (shown only in FIG. 6) attached to anchoring points either side of the long axis of a coil mounted in the shaper and permitting controlled movement of the gripper 48 parallel to and at right angles to said axis—there being two such piston-in-cylinder arrangements at each end of the coil and on opposite sides of the said axis. As illustrated, the piston-in-cylinder arrangements 49 work parallel to the axis, but the pistons may be oppositely inclined towards the said axis.

The grippers 48 comprise radius pegs 48a and clamps 48b gripping the faces of the coil blank, the clamps 48b being themselves fluid-pressure operated by piston-in-cylinder arrangements, not shown for reason of clarity, both to grip the coil and to control its twisting as the coil is spread.

The arrangement described so far is capable, given suitable controls for the movement of the piston-in-cylinder arrangements, of spreading a loop coil blank into a diamond coil with good control over the spreading and angling of the straight, parallel slot-fitting sections 12 and the position and orientation of the knuckles 14. Previous coil shapers have in general controlled the spreading and angling of the slot-fitting sections 12 and have left more or less to chance and the attention of an artisan with a mallet the forming of the end sections. By positively controlling the knuckles 14, the coil is much more precisely shaped and the labour content of the cost is substantially reduced, as well as the time taken to shape the coil so that the output of the shaper is very substantially increased leading to a lower capital cost for a given coil shop capacity.

The improvement in the accuracy with which the coil is shaped at the ends due to the improved technique makes it easier and quicker to wind the coils into a stator, and means that the coils are not subjected to so much flexure to make them fit, which means that the applied insulation is not disturbed so much. Such disturbance as is required to fit conventionally shaped coils into stator slots leads to failures in the insulation necessitating expensive replacement or repair or—worse—premature failure in use.

Further improvement in the shape of the ends of the coil, however, may still be obtained with further improvements according to the invention now to be particularly described.

Figure 8:
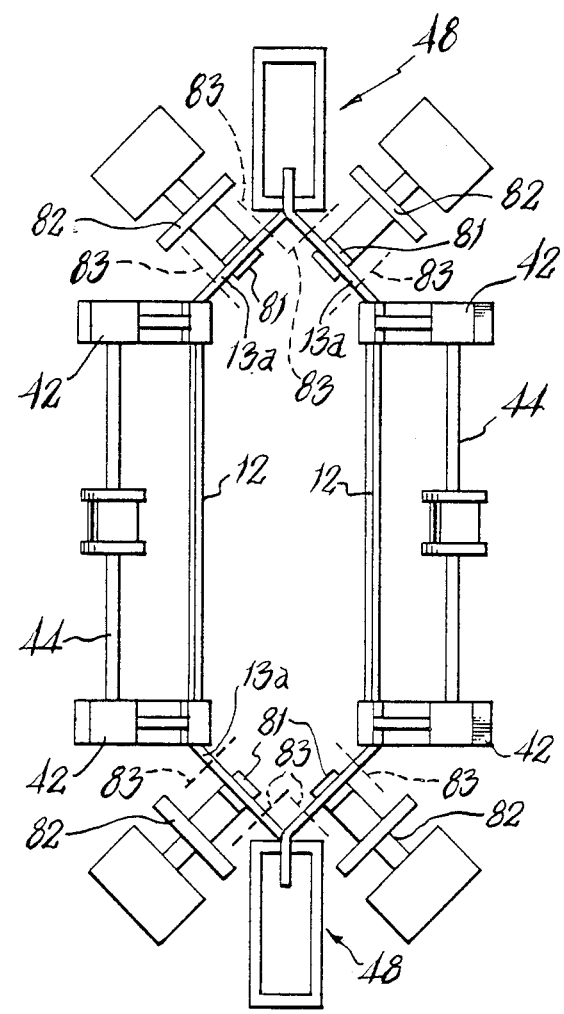
FIG. 8 is a plan view of the shaper as shown in FIG. 6, with additional features.

FIG. 8, which is a plan view of the shaper shown in FIG. 6 with just a few parts not shown, but with additional features, shows, for each diagonal section 13a of the coil, a further controlling gripper 81 controlled by a further piston-in-cylinder arrangement 82, itself so controlled as to determine the correct angle and position of the section of the diagonal 13a gripped thereby.

Further similar piston-in-cylinder controlled grippers can be added further to control the angles and positions of the diagonal sections at additional points indicated in FIG. 8 by lines referenced 83 (also shown in FIG. 2).

When the grippers 81 and further grippers for the points 83 are added, given proper control, of course, of the associated piston-in-cylinder arrangements, the accuracy with which the coil is shaped is considerably further improved. At least, provided the motions of the various grippers are exactly, or substantially exactly, reproduced from coil to coil, each coil will by identical with each other coil. At its simplest, the problem is that of providing a coil shaper with a given initial position for all its grippers and a given final position for all its grippers and being able to reproduce these positions. More generally, since the equipment may and probably will be required to produce coils in a range of sizes and a variety of shapes, it involves being able to program the equipment to produce any such desired size and shape of coil. This can be achieved, without need of further explanation, by use of a microprocessor controlling the piston-in-cylinder arrangements via appropriate solenoid valves, servo or stepping motors and/or other means.

The arrangement of the coil shaper described herein is very well adapted to automatic loading and unloading of coils, since the coil is loaded and unloaded from the top, permitting easy access for mechanical loading/unloading means.

I claim:

1. A coil shaper for coils of rotating electric machines, each said coil initially having two parallel straight sections joined by two curved end sections, said coil shaper comprising:
   first grippers substantially aligned along a first direction;
   second grippers substantially aligned along said first direction;
   means for supporting said first grippers and moving said first grippers from a first position adjacent said second grippers to a second position spaced from said second grippers while simultaneously rotating said first grippers about an axis extending in said first direction;
   means for supporting said second grippers and moving said second grippers from a first position adjacent said first grippers to a second position spaced from said first grippers while simultaneously rotating said first grippers about an axis extending in said first direction, whereby in a coil held by said shaper with said straight sections of said coil respectively gripped by said first and second grippers, said straight sections are mutually rotated and separated in a second direction, said separated straight sections being mutually connected at each end thereof by two diagonal sections and one of said curved end sections;
   third grippers positioned for gripping each of said curved end sections, said third grippers comprising means for controlling the position of said curved end sections during separation and rotation of said straight sections; and
   fourth grippers positioned for gripping each of said diagonal sections.

2. A coil shaper according to claim 1, in which the said third grippers include means to resist inward movement of said curved ends as said straight sections are separated.

3. A coil shaper according to claim 2, in which said means to resist inward movement of said curved ends include means to permit inward movement at a controlled rate.

4. A coil shaper according to claim 1, in which said third grippers include means to control twisting of said curved ends as said straight sections are separated.

5. A coil shaper according to claim 3 wherein said means to permit inward movement comprise fluid pressure means.

6. A coil shaper according to claim 5, in which said fluid pressure means comprise, for each said third gripper, a pair of fluid cylinder actuators attached to anchoring points either side of said third gripper, said fluid cylinder actuators being oriented for permitting controlled movement of said third gripper in said first direction.

7. A coil shaper according to claim 6, wherein said fluid cylinder actuators are angled with regard to said first direction.

8. A coil shaper according to claim 1, in which said third grippers comprise clamp means gripping the faces of said coil.

9. A coil shaper according to claim 8, in which said clamp means are fluid-pressure activated.

10. A coil shaper according to claim 1, in which each said fourth gripper is positioned at a part of the said diagonal section which remains unrotated about a reference angle in a lengthwise direction thereof following said separation of said straight sections.

11. A coil shaper according to claim 10, in which additional fifth grippers are provided for each diagonal section at either side of said fourth gripper.

12. A coil shaper according to claim 1, in which said first, second and fourth grippers comprise coil-section engaging claw members fixed at the ends of adjustable arms and co-operating clamping members.

13. A coil shaper according to claim 12, in which said co-operating clamping members are fluid pressure actuated.

14. A coil shaper according to claim 12, in which said adjustable arms are adjustable both as to their length and orientation.

15. A coil shaper according to claim 14, in which said adjustable arms are adjusted by fluid pressure means.

16. A coil shaper according to claim 1, further comprising control means adapted to control the shaper to perform a fixed cycle of operations repetitively.

17. A coil shaper according to claim 16, said control means being adapted to carry out different operational cycles to produce coils to different specifications.

18. A coil shaper according to claim 16, said control means comprising a microprocessor.

* * * * *